United States Patent [19]
Dale, Jr. et al.

[11] Patent Number: 5,909,379
[45] Date of Patent: Jun. 1, 1999

[54] CUSTOM VEHICLE WHEEL ALIGNER

[75] Inventors: James L. Dale, Jr., Conway, Ark.;
Patrick O'Mahony, Cork, Ireland;
Norman H. Johnson, Jr., St. Cloud, Fla.

[73] Assignee: Snap-on Technologies, Inc., Lincolnshire, Ill.

[21] Appl. No.: 08/719,013

[22] Filed: Sep. 24, 1996

Related U.S. Application Data

[XX .
[60] Provisional application No. 60/005,608, Oct. 19, 1995, and provisional application No. 60/005,458, Oct. 20, 1995.

[51] Int. Cl.$^6$ ..................................................... G06F 19/00
[52] U.S. Cl. ............................................. 364/578; 701/33
[58] Field of Search .............................. 364/578, 551.01, 364/559; 701/29, 33

[56] References Cited

U.S. PATENT DOCUMENTS

| | | | |
|---|---|---|---|
| 4,381,548 | 4/1983 | Grossman et al. | 364/551 |
| 4,574,490 | 3/1986 | Curchod . | |
| 4,761,749 | 8/1988 | Titsworth et al. | 364/559 |
| 4,811,250 | 3/1989 | Steber et al. | 364/551 |
| 4,835,714 | 5/1989 | Sano et al. | 364/551.01 |
| 4,931,964 | 6/1990 | Titsworth et al. | 364/559 |
| 5,014,227 | 5/1991 | Kling et al. | 364/559 |
| 5,165,177 | 11/1992 | Kercheck | 33/203.18 |
| 5,218,556 | 6/1993 | Dale, Jr. | 364/559 |
| 5,388,057 | 2/1995 | January | 364/551.01 |
| 5,442,549 | 8/1995 | Larson | 364/424.01 |
| 5,488,472 | 1/1996 | January | 356/139.09 |
| 5,513,439 | 5/1996 | Brauer et al. | 33/203.18 |
| 5,557,525 | 9/1996 | Miichi et al. | 364/424.05 |
| 5,586,062 | 12/1996 | Colarelli, III | 364/559 |
| 5,598,357 | 1/1997 | Colarelli, III et al. | 364/559 |
| 5,602,733 | 2/1997 | Rogers et al. | 364/424.034 |

FOREIGN PATENT DOCUMENTS 0 679 865 A1  11/1995  European Pat. Off. .
2 685 507 A1   6/1993  France .

*Primary Examiner*—Kevin J. Teska
*Assistant Examiner*—Raymond H. Dalziel
*Attorney, Agent, or Firm*—Niro, Scavone, Haller & Niro

[57] ABSTRACT

In combination with a vehicle wheel aligner comprising at least one sensor for generating data indicative of the relative angular orientation of one or more wheels of a vehicle, a computer for calculating alignment values for the vehicle from the data and a video display for displaying the alignment values, the invention is the improvement comprising a digital memory for storing a plurality of vehicle attributes, a computer processor for causing two or more of the attributes to be displayed on the video display, an input device for allowing the operator to select the attributes relating to a subject vehicle, and a digital memory for storing the attributes relating to the subject vehicle which are selected by the operator, whereby a computer model of the subject vehicle is created.

7 Claims, 10 Drawing Sheets

FIG. 4A
TRUCK TYPE SELECTION

- [FIXED FRAME TRUCK/ BUS]
- SEMI TRAILER/ DOLLY
- FULL TRAILER
- ARTICULATED VEHICLE

1 [ ] 2 [ ] 3 [ ] 4 [ ]

FIG. 4B
HEAD POSITION

1. MOUNT HEADS ON WHEELS OF DISPLAYED AXLE.
2. MEASURE HEIGHT OF LASER PROJECTOR FROM GROUND.
3. PRESS ENTER.

1 [ ] 2 [ ] 3 [ ] 4 [EXIT]

FIG. 4C
FRAME GAUGE POSITION

1. MOUNT FRAME GAUGES AT ENDS OF VEHICLES AS SHOWN.
2. SET MIDPOINTS OF TARGETS AT SAME HEIGHT AS PROJECTORS.
3. LEVEL THE FRAME GAUGES AND HEADS.
4. PRESS ENTER.

1 [ ] 2 [ ] 3 [ ] 4 [ ]

FIG. 4D
TRUCK TYPE SELECTION

- FIXED FRAME TRUCK/ BUS
- [SEMI TRAILER/ DOLLY]
- FULL TRAILER
- ARTICULATED VEHICLE

HEAD POSITION

1. MOUNT HEADS ON WHEELS OF DISPLAYED AXLE.

2. MEASURE HEIGHT OF LASER PROJECTOR FROM GROUND.

3. 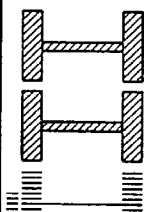 PRESS ENTER.

1 [🖨] 2 [ ] 3 [ ] 4 [EXIT]

FIG. 4F

INSTALL FRAME GAUGES

1. PLACE ADAPTER JT180 IN DOLLY TOWBAR HOLE OR ON SEMI TRAILER KING PIN.

2. INSTALL FRAME GAUGES AT THE SAME HEIGHT AS PROJECTORS.

3. LEVEL THE FRAME GAUGES.

4. 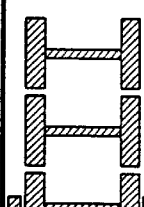 PRESS ENTER.

ADJUST FRONT FRAME GAUGE

1. CHECK TO MAKE SURE THAT THE FRONT GAUGE IS APPROXIMATELY SQUARE TO THE FRAME.

2. LEVEL BUBBLE ON BOTH OF THE HEADS

3. 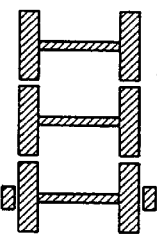 PRESS ENTER.

ADJUST FRONT FRAME GAUGE

4. ADJUST THE FRONT GAUGE BY THE FOLLOWING DISTANCE IN THE DISPLAYED DIRECTION.

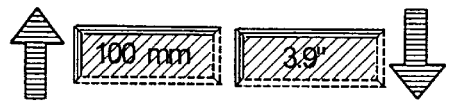

*ADJUST LEFT FORWARD OR RIGHT BACK*

1 [READJUST] 2 [ ] 3 [ ] 4 [ ]

TRUCK TYPE SELECTION

FULL TRAILER TURNING POINT SELECTION

HEAD POSITION

FRAME GAUGE POSITION

HEAD POSITION

HEAD POSITION

FRAME GAUGE POSITION

TRUCK TYPE SELECTION

ARTICULATION POINT

ALIGN ARTICULATED VEHICLE

ALIGN ARTICULATED VEHICLE

ALIGN ARTICULATED VEHICLE 5,909,379

CUSTOM VEHICLE WHEEL ALIGNER

This application is based on U.S. Provisional patent application Ser. No. 60/005,608 filed on Oct. 19, 1995 and U.S. Provisional patent application No. 60/005,458 filed on Oct. 20,1995.

BACKGROUND OF THE INVENTION

The present invention relates to vehicle wheel aligners which may be adapted for use in performing alignments of non-standard or custom vehicles.

Existing wheel aligners comprise a number of sensors for generating data indicative of the relative orientations of the wheels of a vehicle, a computer for calculating alignment values from the data generated by the sensors and a video display for displaying the alignment values. Additionally, these aligners typically comprise a database of vehicle alignment specifications for a majority of vehicle makes and models. During operation, the computer calculates the alignment values for a subject vehicle and compares these values with the alignment specifications for that vehicle. The differences between the calculated alignment values and the specifications may then be displayed.

SUMMARY OF THE INVENTION

According to the present invention, the aligner comprises a pre-programmed set of instructions for interactively guiding the operator through the process of creating a model of a non-standard or custom vehicle, such as a truck. Based on the information provided by the operator, the aligner generates a set of recommended specifications for the vehicle or, at the operator's discretion, allows the operator to create his own specifications for the vehicle. In a further embodiment of the invention, the aligner applies the information provided by the operator to a set of pre-programmed alignment procedure rules and generates a set of instructions to guide the operator in carrying out the alignment procedure on the non-standard or custom vehicle. Of course, these rules may also be applied to guide the operator through an alignment of a standard vehicle. In yet another embodiment of the invention, the aligner uses previously obtained alignment values to modify the vehicle specifications according to pre-established associativity rules to further aid the operator in making the appropriate adjustments to the vehicle.

DETAILED DESCRIPTION OF THE PREFERRED EMBODIMENTS

The present invention provides a useful tool for effecting alignments of non-standard or custom vehicles for which manufacturers'specifications may not be available. The invention is primarily implemented through computer software, which can be readily recreated by the person of ordinary skill in the art by following this description. The invention may be incorporated into a variety of vehicle wheel aligners, but it is particularly useful with wheel aligners designed for use with trucks because of the existence of a great number of nonstandard or custom trucks for which manufacturers'specifications are not available. Therefore, for purposes of brevity the present invention will be described with reference to an exemplary truck aligner.

Figure 1:
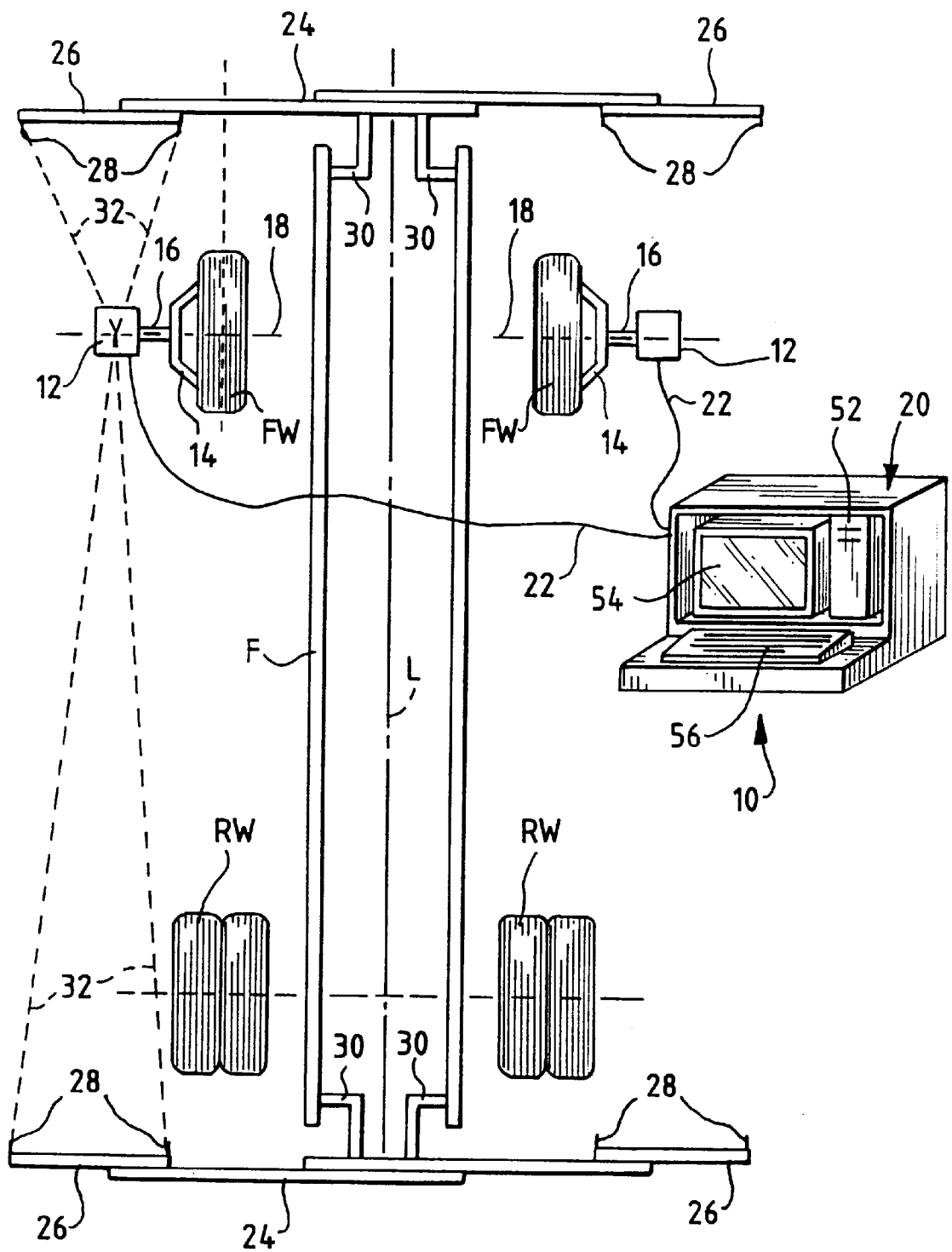
FIG. 1 is a representation of an exemplary wheel aligner in combination with which the present invention may be used.

Referring to FIG. 1, an exemplary truck aligner, indicated generally by reference number 10, is shown in association with a truck which is represented by a frame F having a longitudinal axis L and a set of front wheels FW and rear wheels RW. Truck aligner 10 comprises one or more angle measuring heads 12, which are mountable to the wheels of the truck using appropriate wheel clamps 14. In FIG. 1, a head 12 is shown mounted to each front wheel FW of the truck. Each wheel clamp 14 comprises a shaft 16 and suitable means for aligning shaft 16 with the axis of rotation 18 of the wheel to which it is connected, and the corresponding head 12 is pivotably mounted on shaft 16. Truck aligner 10 also comprises a console 20 to which heads 12 are connected through cables 22 or, alternatively, cordless data transceiver means.

Truck aligner 10 further comprises two frame gauges 24, which each include two scales 26 connected to the opposite ends of frame gauge 24. Each scale 26 in turn comprises a pair of reference marks 28 spaced a known distance from each other. Frame gauges 24 are mounted to opposite ends of frame F using suitable attachment devices 30 having appropriate biasing means for maintaining the same distance between longitudinal axis L and each pair of reference marks 28.

Figure 2:
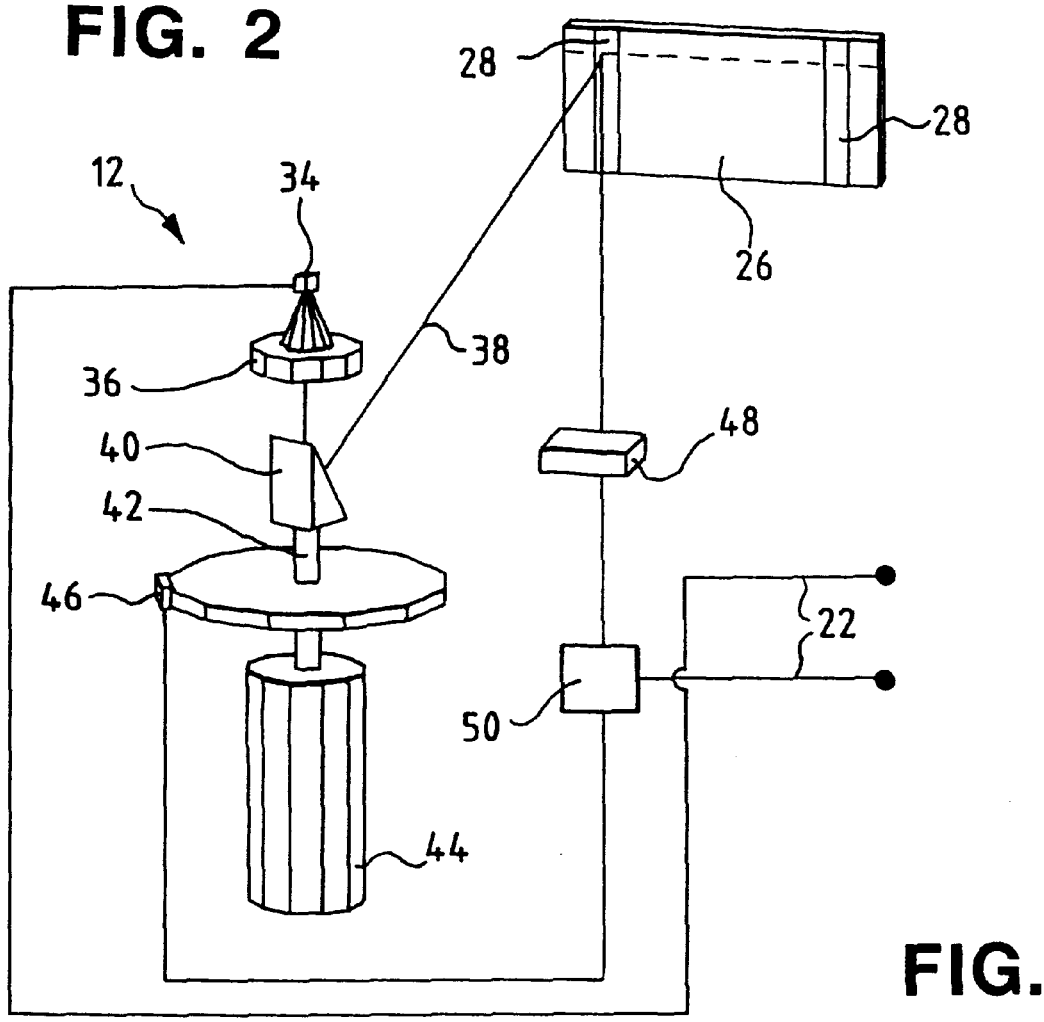
FIG. 2 is a representation of an angle measuring instrument employed in the wheel aligner of FIG. 1.

Each angle measuring head 12 operates to measure the angles between the axis of rotation 18 of the wheel on which it is mounted and the lines 32 extending to reference marks 28 on the same side of the truck. Referring to FIG. 2, each head 12 is shown to comprise a light source 34, a collimating lens 36 for focusing the light into a thin beam 38 and a mirror 40 for reflecting beam 38 ninety degrees into an approximately horizontal plane. Mirror 40 is mounted on the shaft 42 of a motor 44, and rotation of mirror 40 by motor 44 causes beam 38 to rotate in the horizontal plane. A rotary encoder 46 mounted relative to shaft 16 continuously tracks the instantaneous angular position of shaft 42, and thus beam 38, with respect to shaft 16. Since shaft 16 is effectively aligned with the axis of rotation 18 of the wheel, encoder 46 measures the angle of beam 38 with respect to the axis of rotation 18. Reference marks 28 on targets 26 are comprised of a retroreflective material, and as rotating beam 38 impinges on a reference mark 28, it will be reflected back to head 12 and received by a detector 48. The signals from encoder 46 and detector 48 are input into an appropriate logic circuit 50, which outputs data indicative of the angle of reference mark 28 relative to shaft 16. As beam 38 rotates through 360 degrees, data relating to the angles of the other three reference marks 28 on the same side of the truck is similarly produced. The data from each head 12 is transmitted over cables 22, or via cordless data transceiver means, to console 20.

Although not shown in the drawings, heads 12 may also include conventional inclinometers for measuring the orientations of the wheels with respect to known vertical reference planes to yield such information as the camber and caster angles of the wheels. The data generated by the inclinometers is transmitted to console 20 in a manner similar to that described above.

Referring again to FIG. 1, console 20 is shown to comprise a programmable computer 52 for controlling the operation of truck aligner 10. In one mode of operation, computer 52 processes the data generated by heads 12 according to preprogrammed instructions and displays the alignment values for the truck on a monitor 54. A keyboard 56 is provided for entering instructions and vehicle information into computer 52. Computer 52 may also access programs and vehicle information through a floppy disk or CD ROM drive (not shown).

According to the present invention, computer 52 comprises a pre-programmed set of instructions for interactively guiding the operator through the process of creating a model of a non-standard or custom vehicle, such as a truck. Based on the information provided by the operator, computer 52 generates a set of recommended specifications for the vehicle or, at the operator's discretion, allows the operator to create his own specifications for the vehicle. In a further embodiment of the invention, computer 52 applies the information provided by the operator to a set of pre-programmed alignment procedure rules and generates a set of instructions to guide the operator in carrying out the alignment procedure on the non-standard or custom vehicle. Of course, these rules may also be applied to guide the operator through an alignment of a standard vehicle. In yet another embodiment of the invention, computer 52 applies the readings obtained by measuring heads 12 for certain axles to the specifications for the other axles according to pre-established associativity rules to further aid the operator in making the appropriate adjustments to the vehicle. Although for purposes of brevity and clarity the invention will be described with respect to the alignment of a truck, it should be understood that the principles of the invention apply to the alignment of many types of vehicles. The person of ordinary skill in the art will readily understand how the invention may be adapted for use with other types of vehicles.

Figure 3:
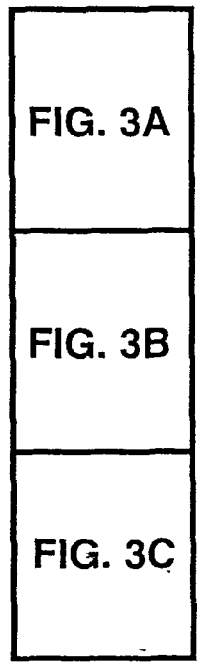
FIGS. 3A and 3B are a diagram showing the sequence of screens which guide the operator through the process of creating a vehicle model and specifications according to the present invention.
Figure 3A:
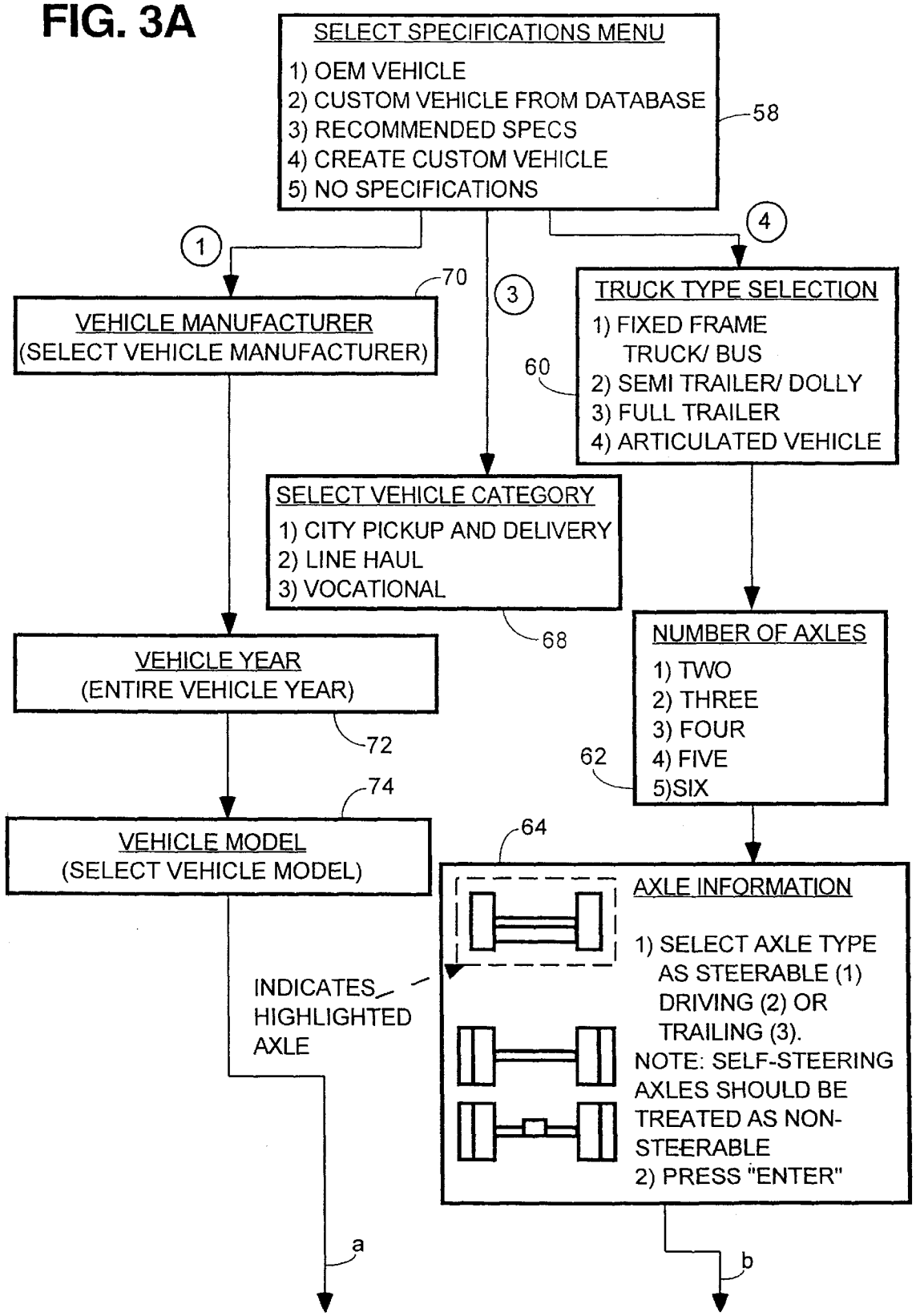
Figure 3B:
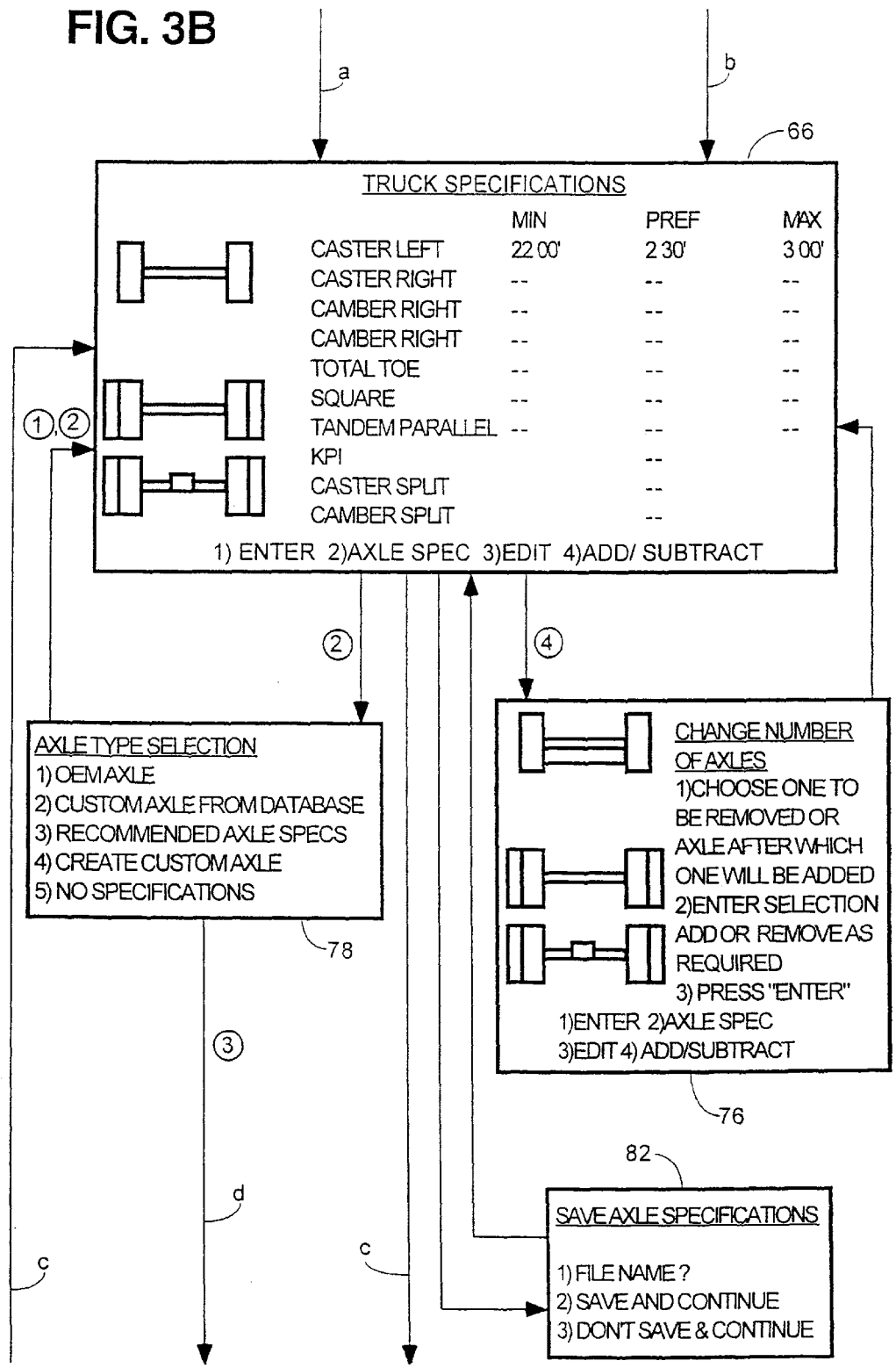
Figure 3C:
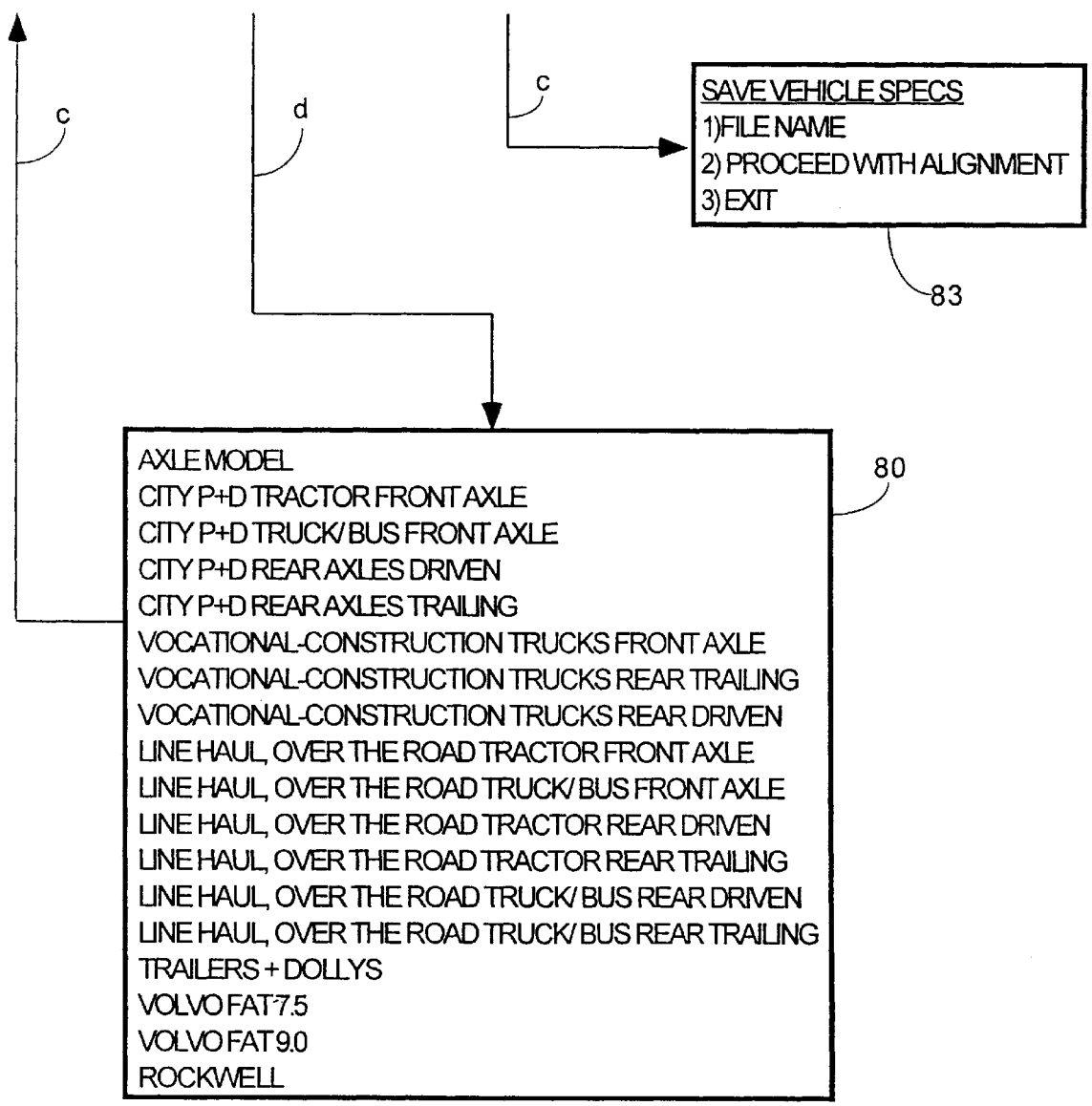
Figure 4I:
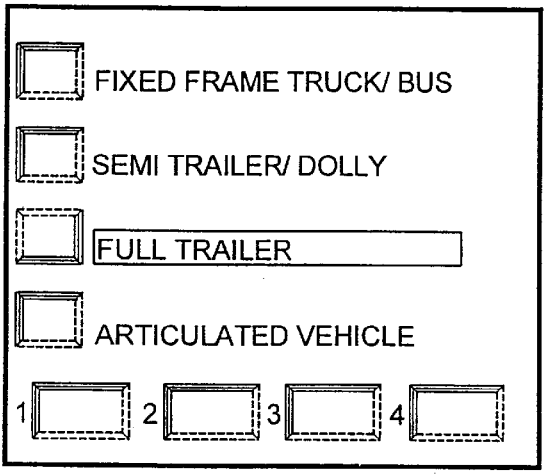
FIGS. 4A through 4T are a sequence of screen displays which illustrate an application of the alignment procedure rules according to the present invention.
Figure 4J:
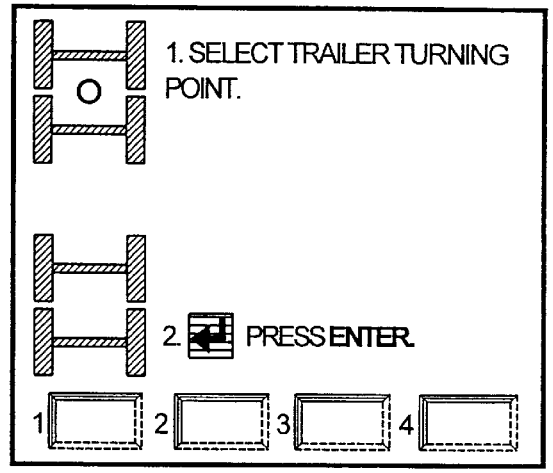
Figure 4K:
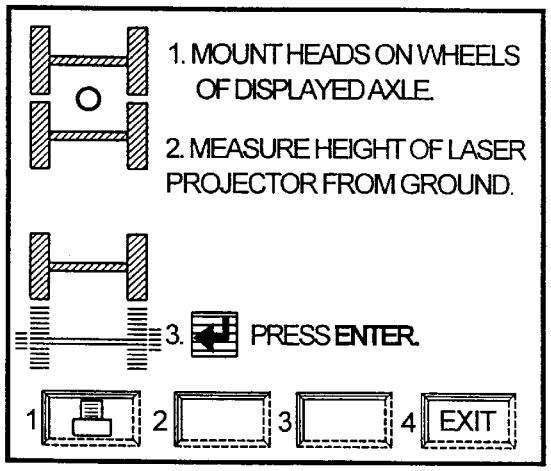
Figure 4L:
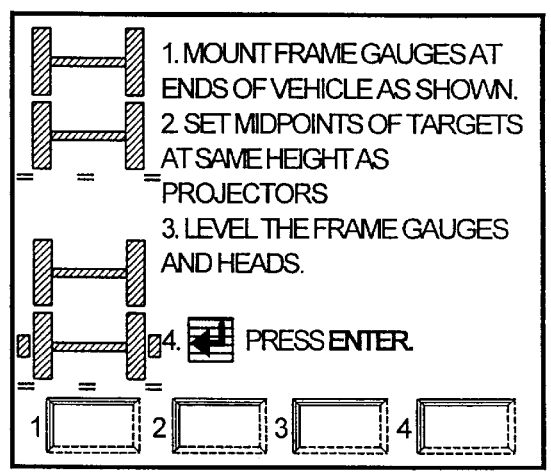
Figure 4M:
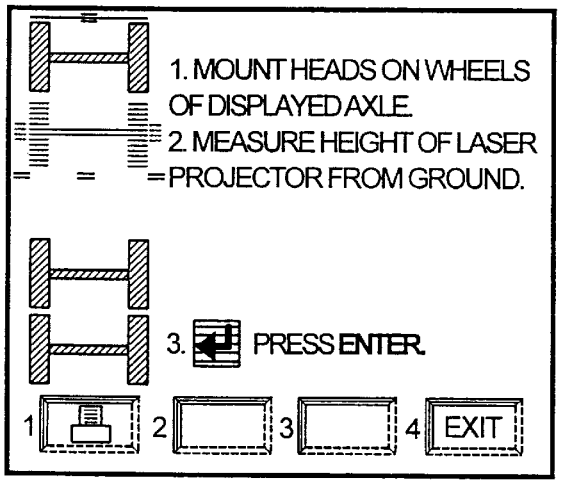
Figure 4N:
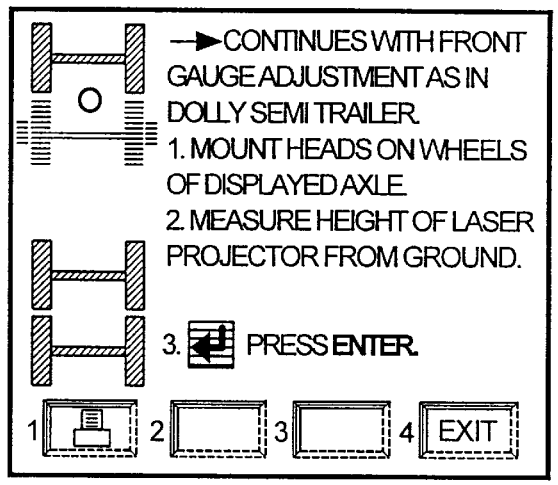
Figure 4O:
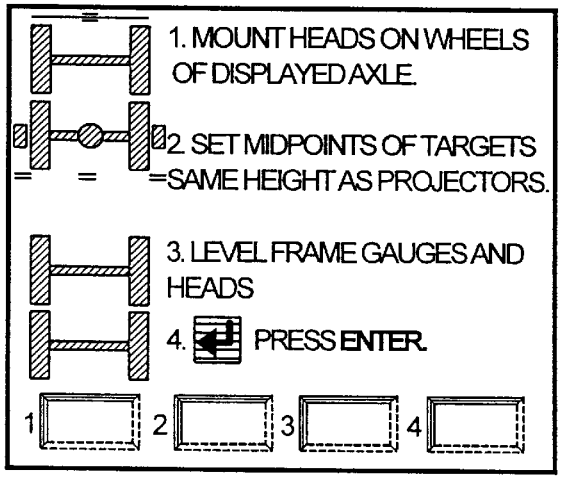
Figure 4P:
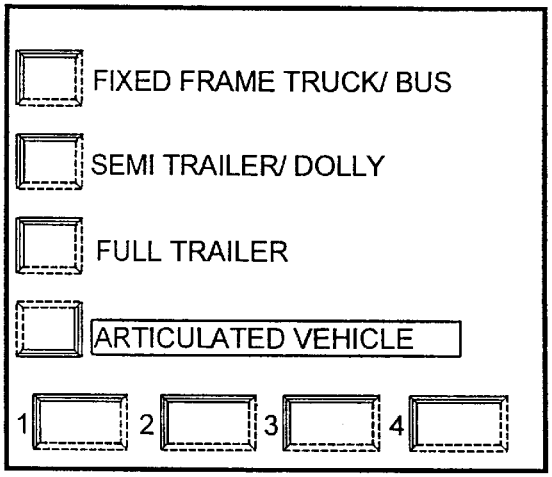
Figure 4Q:
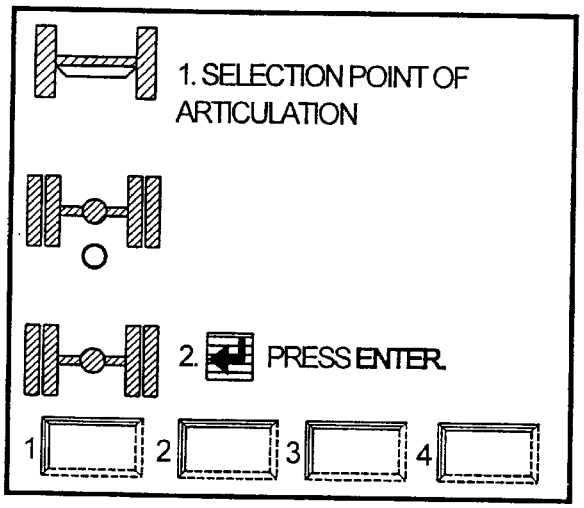
Figure 4R:
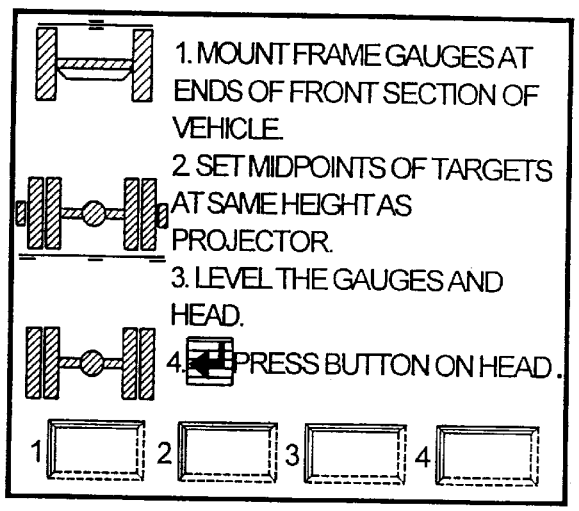
Figure 4S:
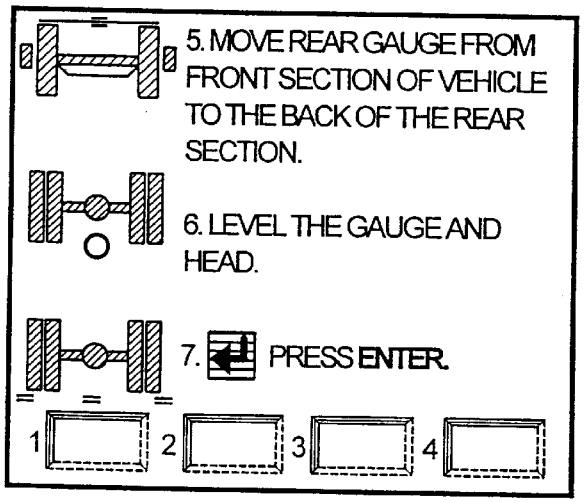
Figure 4T:
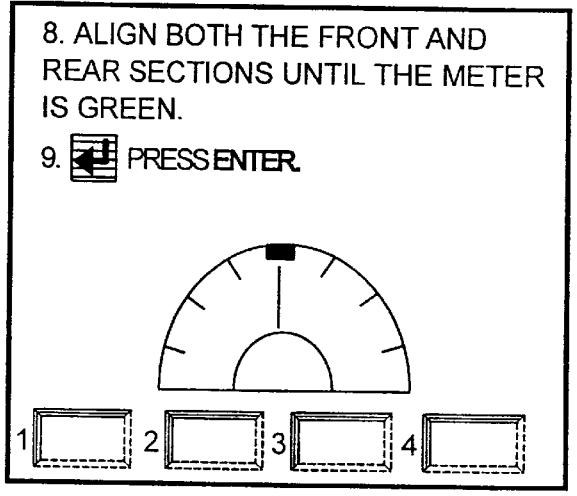

Referring to FIG. 3, computer 52 is programmed to generate a sequence of screen displays on monitor 54 to interactively guide the operator through the process of creating a model of a non-standard or custom truck and a set of specifications for the truck. A number of vehicle attributes which together define a particular vehicle, such as truck type, vehicle category and number of axles, are stored in computer 52. The screen displays guide the operator in selecting the attributes for a subject vehicle. In response to the screen displays, the operator enters the requested information or makes an appropriate selection through keyboard 56 or similar means. Computer 52 operates on the information and selections provided by the operator until the process is completed and the model and specifications are created. The computer code required to generate the screen displays, respond to the operator's inputs and create the model and specifications may be readily reproduced by a person of ordinary skill in the art from the information provided in FIG. 3 and the below description.

Starting in the Select Specifications Menu screen 58, in order to create a model of the truck he wishes to align, the operator selects option 4, Create Custom Vehicle. Computer 52 responds by displaying the Truck Type Selection screen 60, in response to which the operator selects the truck type corresponding to the subject truck. Computer 52 then displays the Number of Axles screen 62, in response to which the operator enters the selection corresponding to the number of axles of the subject truck. Thereafter, computer 52 displays the Axle Information screen 64. This screen allows the operator to classify each axle of the subject truck as "steerable, "driving" or "trailing". In this regard, driving and trailing axles are considered to be non-steerable axles. Based on the information provided up to this point, computer 52 generates a representation of the axles of the subject truck in screen 64 and highlights the top axle. Once the operator classifies the highlighted axle, computer 52 highlights the next axle, thereby enabling the operator to classify that axle. This process continues until all of the axles have been classified, at which point the operator presses the Enter key. The model of the subject vehicle is now complete, and the operator may proceed to the next screen to define his own specifications for the subject truck.

Upon pressing the Enter key in screen 64, computer 52 will display the Truck Specifications screen 66. Screen 66 comprises a representation of the axles of the subject truck and a table of alignment values. A table of alignment values exists for each axle, and the axle to which the current displayed table corresponds is shown highlighted in screen 66. For each alignment value, screen 66 shows a preferred specification and acceptable tolerance limits defined by minimum and maximum values. At this point no numbers exist in the minimum, preferred and maximum columns for each alignment value. To create a set of specifications for the subject truck, the operator selects the Edit option. This allows the operator to enter desired specifications and minimum and maximum tolerance limits into each table entry. The operator is similarly able to enter desired values for the other axles by highlighting them in turn.

Alternatively, the operator can choose to have computer 52 provide a set of recommended specifications for the subject truck. To do this, the operator selects the Recommended Specs option in screen 58. In response to this selection, computer 52 displays a Select Vehicle Category screen 68, from which the operator selects the category corresponding to the primary use of the subject truck. The recommended specifications are preselected values that have been derived for each category based on experience and stored in computer 52. Once the appropriate category is selected, the process proceeds through screens 60, 62 and 64, and the recommended specifications for each axle of the subject truck are displayed in screen 66. In another embodiment of the invention, the Select Vehicle Category screen 68 may follow screen 64.

In a further embodiment of the invention, the operator may create a suitable model and specifications for the subject truck by modifying prestored specifications for a standard or previously created custom truck. To do this, the operator selects either option 1, OEM Vehicle, or option 2, Custom Vehicle from Database, from screen 58. If option 1, OEM Vehicle, is selected, the computer will prompt the operator through successive screens 70, 72 and 74 to provide the manufacturer, the year and the model for a standard vehicle that may closely resemble the subject truck. Computer 52 will then display the prestored manufacturer's specifications for the standard truck in screen 66, the current displayed specifications being those for the axle which is highlighted in screen 66. If option 2, Custom Vehicle from Database, is selected, computer 52 will display the prestored specifications for the custom truck in screen 66. If the axles of the subject truck are similar to the axles of the standard or custom truck, the operator may choose to proceed with the alignment on the basis of these specifications or edit the specifications using the Edit option discussed above. If the axles of the subject truck are different from the axles of the standard or custom truck, the operator may select the Add/Subtract option in screen 66. In response to this selection, computer 52 will display the Change Number of Axles screen 76, through which the operator is allowed to add or delete certain axles from the model of the standard or custom truck to thereby create a model of the subject truck. Upon completion of the operations requested in screen 76, computer 52 returns to screen 66 and displays the specifications for the newly created model.

At this point, the operator may choose to change or create new specifications for a particular axle or axles of the newly created model. This is initiated by highlighting the axle to be changed and selecting the Axle Spec option in screen 66, in response to which computer 52 will display the Axle Type Selection screen 78. From this screen the operator may either create an original set of specifications for the axle, use specifications relating to a standard or previously created custom axle, or choose from among a database of recommended specifications. Selecting option 4, Create Custom Axle, in screen 78 causes computer 52 to display screen 66 with no numbers in the minimum, preferred and maximum columns for the alignment values. The operator may then insert his own specifications by selecting the Edit option, as discussed above. Selecting options 1 or 2 in screen 78 causes computer 52 to insert in screen 66 previously stored specifications for a standard or custom axle, respectively. Selecting option 3, Recommended Axle Specs, from screen 78, causes computer 52 to display the Axle Model screen 80. From screen 80 the operator may select the specifications for the axle which best approximates the subject axle, which specifications are then displayed in screen 66. After the specifications are created for a particular axle, computer 52 will display screen 82, which will allow the operator to save the axle specifications and either proceed with or exit the alignment. After this process is completed for the remaining axles of the subject vehicle, computer 52 will display screen 83, which will allow the operator to save the specifications for the subject vehicle and either proceed with or exit the alignment.

In accordance with another aspect of the present invention, computer 52 applies a preprogrammed set of alignment procedure rules to the information provided by the operator to generate a set of instructions for guiding the operator through the alignment procedure. The instructions are presented to the operator through a sequence of screens displayed on monitor 54. Furthermore, this process is interactive, requiring the operator to complete certain steps in the alignment procedure before computer 52 proceeds to the next instruction.

The alignment procedure rules comprise a set of rules for defining the preferred order in which the axles of the truck are aligned. The flow path rules are set forth in the following table:

Alignment Flow Path Rules:
1. Align the rearmost non-steerable axle first;
2. Align the next forward non-steerable axle;
3. Repeat step 2 until all non-steerable axles are aligned;
4. Align the forward most steerable axle;
5. Align the next rearward steerable axle;
6. Repeat step 5 until all steerable axles are aligned;
7. Align self-steering axles at any time.

Thus, the alignment flow path rules depend on the number of steerable, non-steerable and self-steering axles of the subject vehicle. Once this information is provided to computer 52, either through the modeling procedure described above or through a preexisting database of information for standard vehicles, computer 52 will determine the order in which the axles of the subject vehicle should preferably be aligned and will instruct the operator accordingly through appropriate screen displays.

The alignment procedure rules preferably also comprise a set of rules for determining where to mount the frame gauges during the alignment procedure. These rules depend on the type of truck being aligned, which information can be provided to computer 52 through screen 60 or through a database of information for standard vehicles. Given this information, computer 52 determines the locations on the subject truck where the operator should mount the frame gauges during specific points in the alignment procedure and identifies any special adapters that may be required to mount the frame gauges. Computer 52 then generates appropriate screen displays to instruct the operator accordingly.

FIG. 4 illustrates an example of some of the screen displays computer 52 may generate in implementing the alignment procedure rules. FIGS. 4A through 4C are exemplary screens generated for a fixed frame truck, FIGS. 4D through 4H are the exemplary screens generated for a semi trailer or dolly truck, FIGS. 4I through 4O are the exemplary screens generated for a full trailer truck and FIGS. 4P through 4T are the exemplary screens generated for an articulated truck. The rules for mounting the frame gauges are apparent from these FIGS.

In yet another embodiment of the invention, computer 52 applies the readings obtained by measuring heads 12 for certain axles to the specifications for the other axles according to pre-established associativity rules to further aid the operator in making the appropriate adjustments to the vehicle. According to the flow path rules defined above, certain axles should be aligned before others. This is because certain axles should be aligned with respect to other axles in order to obtain the best results. The associativity rule for the non-steerable axles states that each non-steerable axle must be compared to the rearmost previously measured non-steerable axle.

Square is an alignment value for a non-steerable axle which is analogous to the thrust line of a vehicle. Tandem Parallel is an alignment value defined as the difference between the square of a non-steerable axle and the square of the rearmost previously measured non-steerable axle. Consequently, the initial non-steerable axle which is aligned will have a specification for square but none for tandem parallel, and the remaining non-steerable axles will have specifications for both square and tandem parallel. As discussed above, the specifications have a preferred value and minimum and maximum tolerances. Furthermore, these specifications are usually created before the measurements are taken. Thus, the possibility exists that the square of the initially aligned non-steerable axle will affect the acceptable value for square of the remaining non-steerable axles. For example, if the preferred value for the square of the non-steerable axles is 0° and the minimum and maximum tolerances are −0.1° and 0.1°, respectively, the operator may adjust the initial non-steerable axle until the square is −0.1°, which is an acceptable value. Proceeding to the next toward non-steerable axle, if the preferred value for tandem parallel is 0° and the minimum and maximum tolerances are −0.2° and 0.2°, respectively, the operator may adjust the next non-steerable axle until the tandem parallel value is −0.2°. However, this may result in a value for the square of the next non-steerable wheel of −0.3°, which is out of specification for square.

Therefore, the present invention recognizes the need to associate the measured values of the initially measured non-steerable axle with the remaining non-steerable axles to ensure that all alignment values are within specification.

This is accomplished by applying the difference between the measured and preferred values for the square of the initial non-steerable axle to the tolerance limits for the value for tandem parallel for the remaining axles. In the above example, the difference between the measured and preferred values for square for the initial non-steerable axle is −0.1°. This value is then subtracted from the appropriate minimum or maximum tolerance for the tandem parallel value of the next non-steerable axle. The appropriate tolerance is the one which will remain within specification after the subtraction is completed. In the example, the appropriate tolerance is the minimum tolerance, because subtracting −0.1° from the maximum tolerance would yield a new maximum tolerance of 0.3°, which is outside of the range of the original specifications. Accordingly, the new minimum and maximum tolerances for the tandem parallel value will be −0.1° and 0.2°, respectively. Thus, adjusting the next non-steerable axle to within specification for tandem parallel will result in the square of that axle also being within specification. The modified specifications thus aid the operator in making the adjustments by ensuring that, once an adjustment is made to bring the axle within specification for tandem parallel, the axle will also be in specification for square.

It should be recognized that, while the present invention has been described in relation to the preferred embodiments thereof, those skilled in the art may develop a wide variation of structural details without departing from the principles of the invention. Therefore, the appended claims are to be construed to cover all equivalents falling within the true scope and spirit of the invention.

What is claimed is:

1. In combination with a vehicle wheel aligner comprising at least one sensor for generating data indicative of the relative angular orientation of one or more wheels of a vehicle, a computer for calculating alignment values for the vehicle from the data and a video display for displaying the alignment values, the improvement comprising:

means for storing a plurality of vehicle attributes;

means for causing two or more of the attributes to be displayed on the video display;

input means for allowing the operator to select the attributes relating to a subject vehicle;

means for storing the attributes relating to the subject vehicle which are selected by the operator;

whereby a computer model of the subject vehicle is created.

2. The wheel aligner of claim 1, further comprising means for generating a graphical representation of the computer model from one or more of the attributes relating to the subject vehicle and causing the graphical representation to be displayed on the video display.

3. The wheel aligner of claim 1, further comprising means for guiding the operator in the creation of a set of specifications for the subject vehicle.

4. The wheel aligner of claim 1, further comprising means for storing a general set of rules for aligning vehicles and means for determining from the set of rules and the attributes relating to the subject vehicle a set of instructions for guiding the operator through an alignment of the subject vehicle.

5. A method for creating a set of alignment specifications for a subject vehicle, comprising:

prestoring in a digital memory a plurality of vehicle attributes;

prestoring in digital memory alignment specifications for each of one or more of the vehicle attributes;

visually displaying the vehicle attributes;

selecting one or more of the vehicle attributes relating to the subject vehicle; and generating a set of specifications for the subject vehicle from the prestored alignment specifications corresponding to one or more of the selected vehicle attributes.

6. The method of claim 5, further comprising the steps of:

generating a graphical representation of the subject vehicle from the selected vehicle attributes; and visually displaying the graphical representation of the subject vehicle.

7. The method of claim 5, further comprising the steps of:

prestoring in digital memory a general set of rules for aligning vehicles;

determining a set of instructions for guiding the operator through an alignment of the subject vehicle by applying the general rules to one or more of the selected vehicle attributes; and visually displaying the instructions.

* * * * *